(12) United States Patent
Isobe (10) Patent No.: US 11,241,764 B2
(45) Date of Patent: Feb. 8, 2022

(54) MACHINE TOOL

(71) Applicant: FANUC CORPORATION, Yamanashi (JP)

(72) Inventor: Gaku Isobe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/901,136

(22) Filed: Jun. 15, 2020

(65) Prior Publication Data

US 2021/0031318 A1 Feb. 4, 2021

(30) Foreign Application Priority Data

Jul. 31, 2019 (JP) .............................. JP2019-140799

(51) Int. Cl.
  *B23Q 3/157* (2006.01)
  *B23Q 17/09* (2006.01)
  *B23Q 3/155* (2006.01)
  *G05B 19/00* (2006.01)

(52) U.S. Cl.
  CPC ......... *B23Q 3/157* (2013.01); *B23Q 3/15534* (2016.11); *B23Q 17/0995* (2013.01); *B23Q 3/15706* (2013.01); *Y10T 483/11* (2015.01); *Y10T 483/12* (2015.01); *Y10T 483/13* (2015.01); *Y10T 483/1795* (2015.01)

(58) Field of Classification Search
  CPC .... B23Q 3/155–15793; B23Q 3/15534; B23Q 3/15706; Y10T 483/11; Y10T 483/12; Y10T 483/13

USPC .................................................... 483/2, 4, 7
See application file for complete search history.

(56) References Cited

U.S. PATENT DOCUMENTS

| | | | |
|---|---|---|---|
| 4,616,322 A | 10/1986 | Niwa et al. | |
| 2007/0105697 A1 | 5/2007 | Iefuji | |
| 2017/0203400 A1* | 7/2017 | Isobe | ................... B23Q 17/007 |
| 2018/0354085 A1* | 12/2018 | Li | ...................... B23Q 3/15713 |

FOREIGN PATENT DOCUMENTS

| | | | |
|---|---|---|---|
| EP | 0134935 A2 | | 3/1985 |
| JP | S609631 A | | 1/1985 |
| JP | 05-069259 A | * | 3/1993 |
| JP | H0572342 U | | 10/1993 |
| JP | H08115113 A | | 5/1996 |
| JP | 2003-001540 A | * | 1/2003 |
| JP | 2007125648 A | | 5/2007 |

* cited by examiner

*Primary Examiner* — Erica E Cadugan
(74) *Attorney, Agent, or Firm* — Karceski IP Law, PLLC (57) ABSTRACT

A machine tool includes: a spindle that allows a tool to be detachably mounted thereon; a tool changing device that holds a plurality of the tools, and attaches and detaches any of the tools to and from the spindle; a date and time storage unit that stores date and time when operation of the spindle is stopped last; and a calculation unit that calculates unused time of the spindle on the basis of the date and time stored in the date and time storage unit, when the tool is to be detached from the spindle, wherein in a case where the unused time calculated by the calculation unit is longer than a predetermined threshold value, the tool changing device performs detaching motion of the tool from the spindle for longer time compared to a case where the calculated unused time is at or less than the threshold value.

3 Claims, 7 Drawing Sheets

MACHINE TOOL

CROSS-REFERENCE TO RELATED APPLICATIONS

This application is based on, claims the benefit of, and claims priority to Japanese Patent Application No. 2019-140799, filed on Jul. 31, 2019, the entire content of which is incorporated herein by reference.

FIELD OF THE INVENTION

The present disclosure relates to a machine tool.

BACKGROUND OF THE INVENTION

There is known a machine tool that has an automatic tool changing device, and controls motion of the automatic tool changing device on the basis of weight data of a tool mounted on a spindle (see Japanese Unexamined Patent Application, Publication No. Hei8-115113, for example).

SUMMARY OF THE INVENTION

An aspect of the present disclosure is a machine tool including: a spindle that allows a tool to be detachably mounted thereon; a tool changing device that holds a plurality of tools, and attaches and detaches any of the tools to and from the spindle; a date and time storage unit that stores date and time when operation of the spindle is stopped last; and a calculation unit that calculates unused time of the spindle on the basis of the date and time stored in the date and time storage unit, when the tool is to be detached from the spindle, wherein in a case where the unused time calculated by the calculation unit is longer than a predetermined threshold value, the tool changing device performs detaching motion of the tool from the spindle for longer time compared to a case where the calculated unused time is at or less than the threshold value.

DESCRIPTION OF EMBODIMENT(S) OF THE INVENTION

A machine tool 1 according to an embodiment of the present disclosure will be hereinafter described with reference to the drawings.

Figure 1:
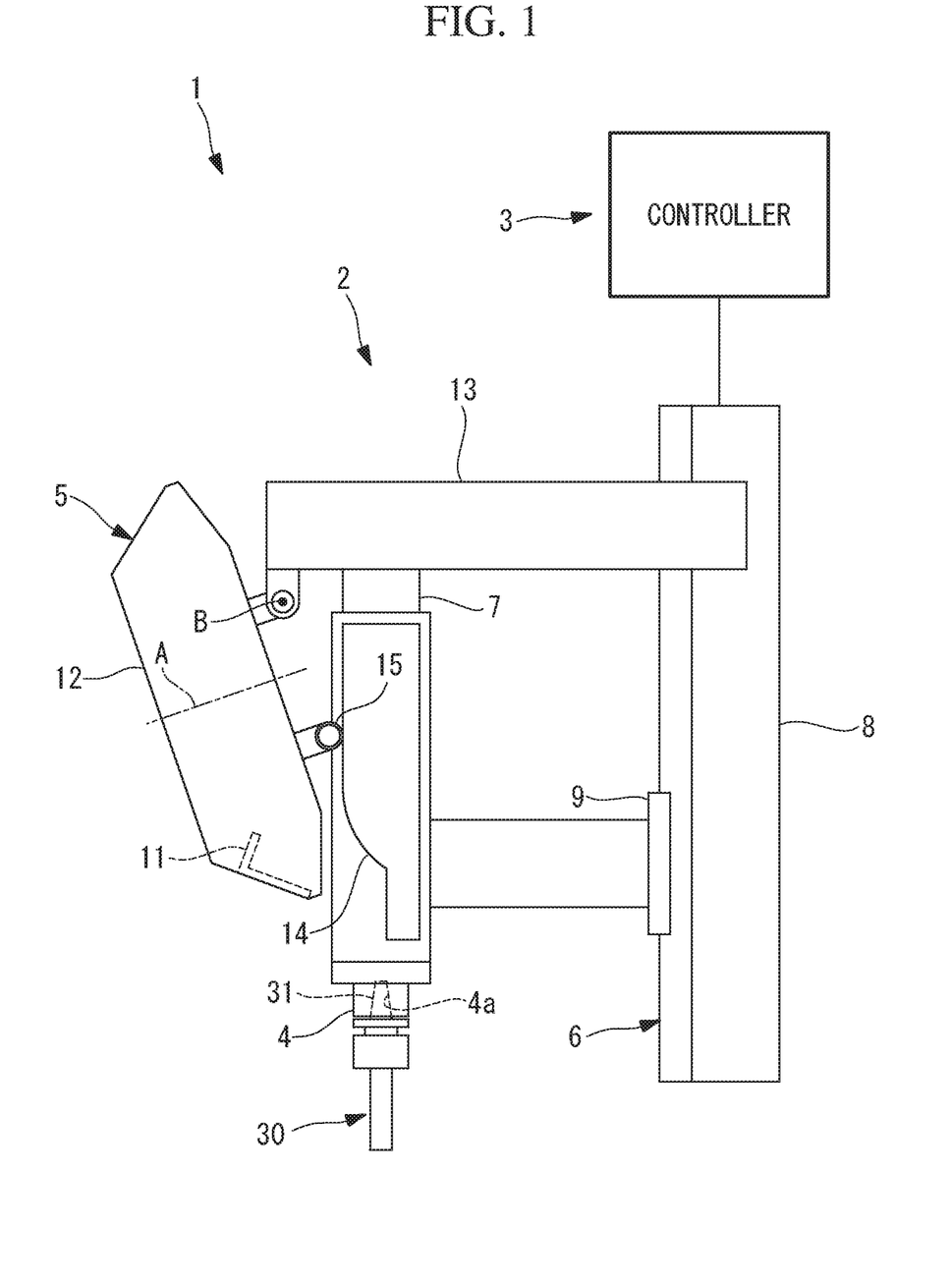
FIG. 1 is an entire configuration diagram illustrating an example of a machine tool according to an embodiment of the present disclosure.

As illustrated in FIG. 1, the machine tool 1 according to this embodiment includes a machine tool body 2 and a controller 3.

The machine tool body 2 includes a spindle 4 that allows a tool 30 to be detachably mounted thereon, and a tool changing device 5 that holds a plurality of the tools 30, and attaches and detaches any of the tools 30 to and from the spindle 4.

Figure 4:
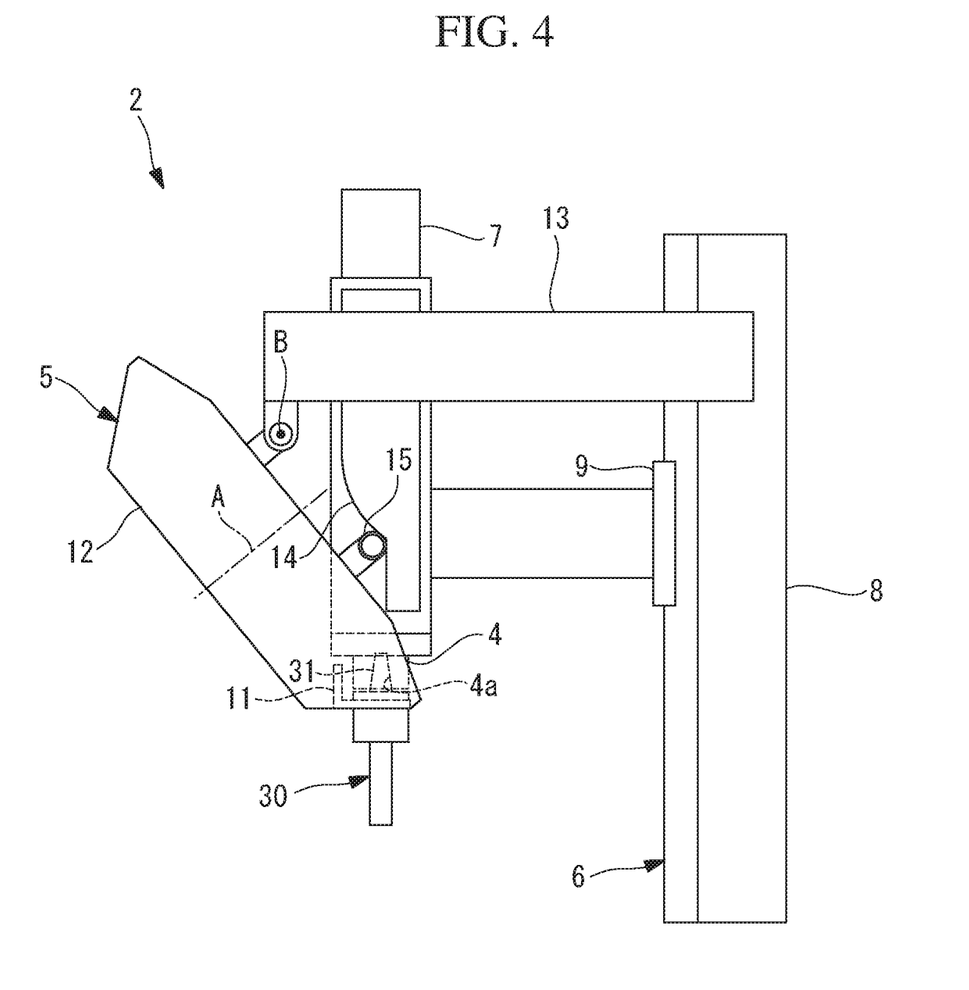
FIG. 4 is a side view schematically illustrating a state in which a tool mounted on the spindle is gripped by a grip provided in a turret of a machine tool body included in the machine tool of FIG. 1.

As illustrated in FIG. 1 and FIG. 4, the spindle 4 is supported by a spindle head 7 movably supported in the vertical direction by a linear motion mechanism 6. The linear motion mechanism 6 includes a base 8 that extends in the vertical direction and is fixed to a floor surface, and a slider 9 that is movable in the direction perpendicular to the base 8, and the spindle head 7 is fixed to the slider 9.

Figure 2:
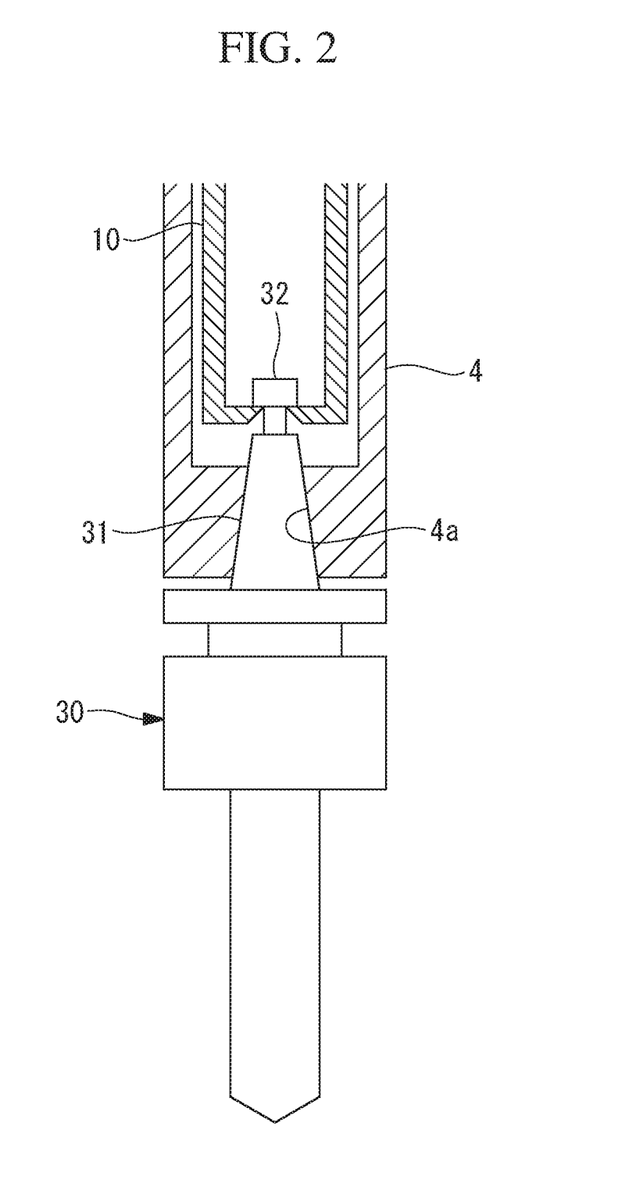
FIG. 2 is a partial longitudinal sectional view schematically illustrating a lower structure of a spindle of the machine tool of FIG. 1.

As illustrated in FIG. 2, in a lower part of the spindle 4, a tapered inner surface 4a that allows a tapered outer surface 31 provided in the tool 30 to be closely attached thereto is provided, and a drawbar 10 that detachably grips a pull stud 32 provided in the tool 30, and draws the pull stud 32 upward is provided. The spindle 4 performs machining by rotationally driving the tool 30 around a vertical axis by a motor (not illustrated) in a state in which the tapered outer surface 31 is closely attached to the tapered inner surface 4a by the drawbar 10.

The tool changing device 5 includes a disk-shaped turret 12 having a plurality of grips 11 disposed at intervals in the circumferential direction. The turret 12 is turnable around a center axis A, and each grip 11 detachably holds the tool 30.

The turret 12 is supported by a support member 13 extending from the base 8 of the linear motion mechanism 6, and supported swingably around a horizontal swing axis B. A cam 14 is provided on a side surface of the spindle head 7, and a cam follower 15 that performs motion following the cam 14 is provided in the turret 12.

Figure 5:
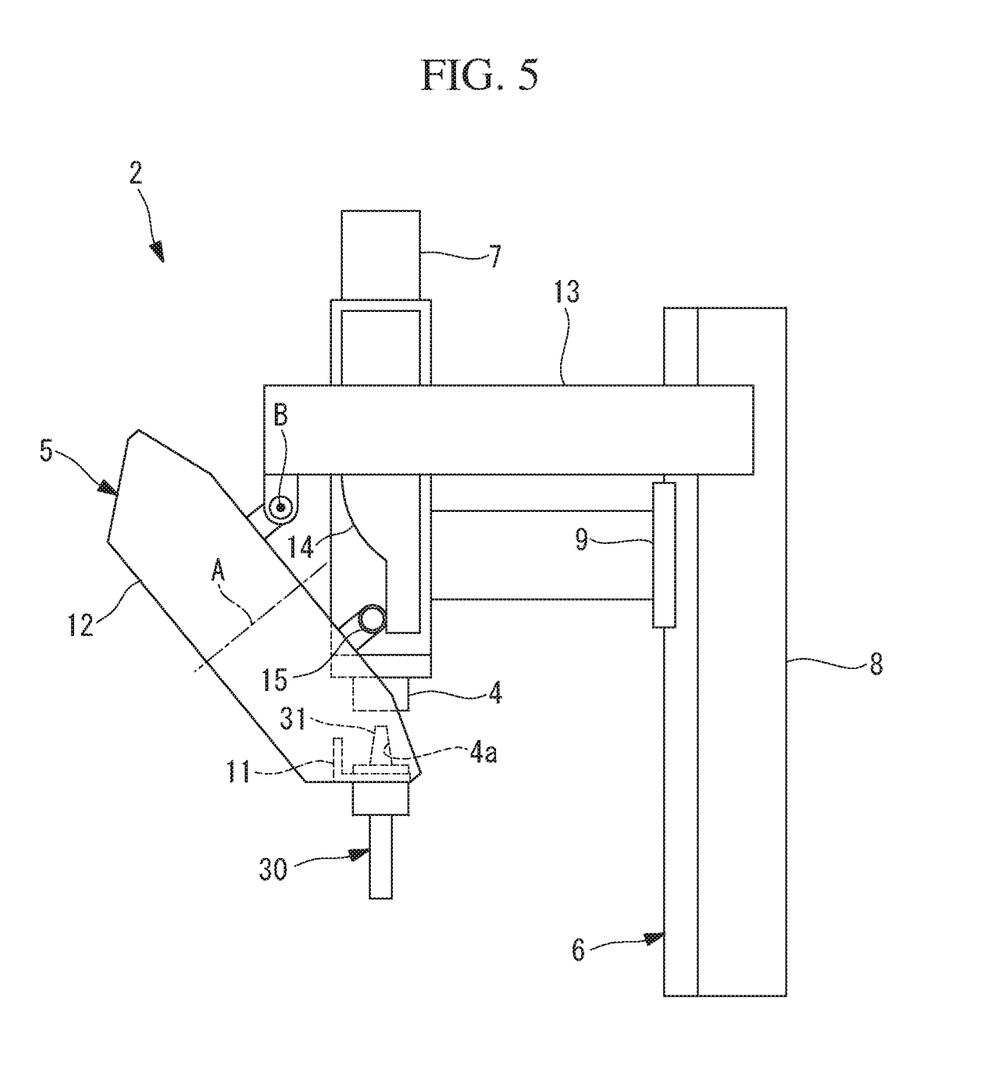
FIG. 5 is a side view illustrating motion for raising the spindle from the state of FIG. 4, and detaching the tool from the spindle.

Consequently, when the spindle head 7 is moved upward, the cam follower 15 moves following the cam 14, so that the turret 12 swings around the swing axis B, and tool 30 is supported by the grip 11, as illustrated in FIG. 4. The mounting state of the tool 30 by the drawbar 10 is released in this state, and thereafter the spindle head 7 is further raised, so that the tool 30 can be detached from the spindle 4 as illustrated in FIG. 5.

When exchange of the tools 30 is commanded by a machining program or the like, the controller 3 controls motion of the tool changing device 5.

Figure 3:
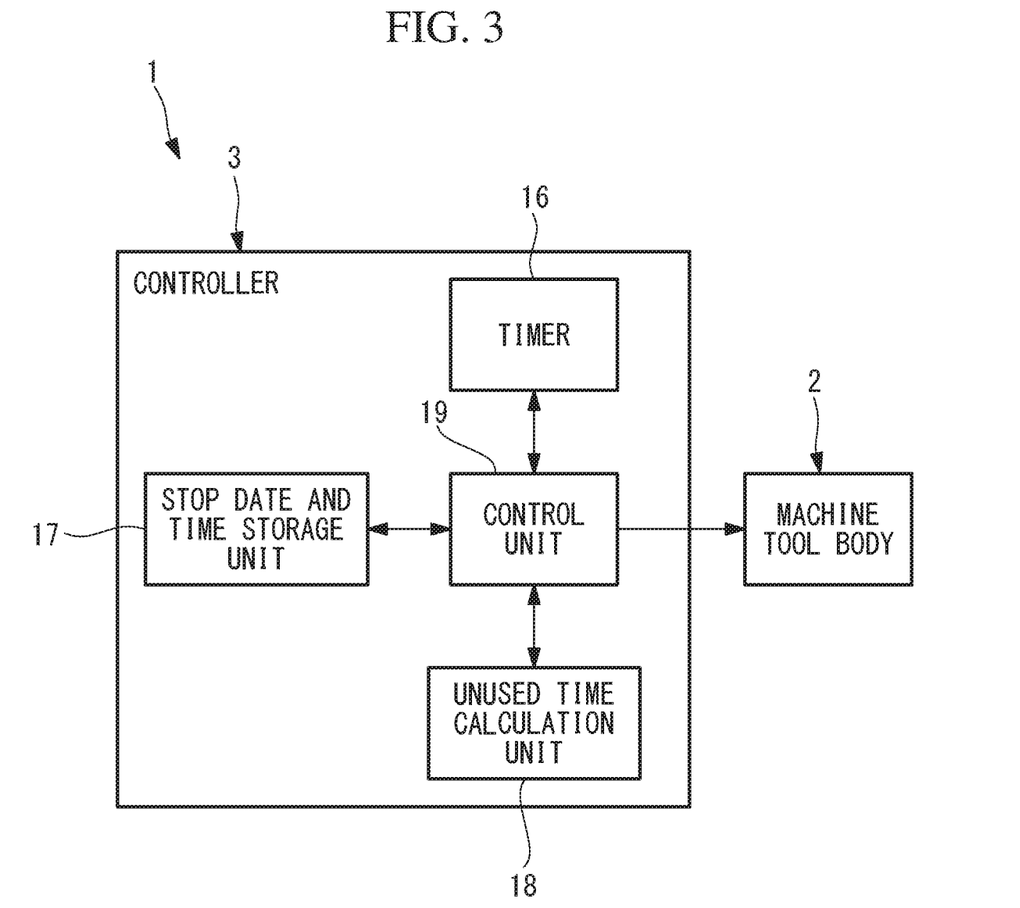
FIG. 3 is a block diagram schematically illustrating an internal structure of a controller included in the machine tool of FIG. 1.

The controller 3 is composed of a processor and a memory.

As illustrated in FIG. 3, the controller 3 includes a timer 16 that generates current time, a stop date and time storage unit (date and time storage unit) 17 that stores date and time when operation of the spindle 4 is stopped last, and a unused time calculation unit (calculation unit) 18 that calculates unused time of the spindle 4 when the tool 30 is to be detached from the spindle 4. The unused time calculation unit 18 calculates unused time on the basis of the date and time stored in the stop date and time storage unit 17, and the current time generated by the timer 16.

The controller 3 includes a control unit 19 that controls the machine tool body 2 on the basis of the unused time calculated by the unused time calculation unit 18. The control unit 19 stores a predetermined threshold value. In a case where the unused time calculated by the unused time calculation unit 18 is longer than the threshold value, the control unit 19 causes the tool changing device 5 to perform detaching motion of the tool 30 from the spindle 4 for longer time compared to a case where the calculated unused time is at or less than the threshold value.

That is, in a case where the calculated unused time is longer than the predetermined threshold value, the motion speed of the spindle 4 at the time of raising the spindle 4 as illustrated in FIG. 5 from a state in which the tool 30 is gripped by the grip 11 of the turret 12 as illustrated in FIG. 4 is reduced compared to a case where the unused time is at or less than the threshold value.

According to the machine tool 1 thus configured according to this embodiment, when the operation of the spindle 4 is stopped by a motion program or the like, date and time when the operation is stopped are stored in the stop date and time storage unit 17 every time. Thereafter, when a command for detaching the tool 30 from the spindle 4 is input by the motion program or the like, the control unit 19 acquires current time generated by the timer 16, and acquires date and time stored last in the stop date and time storage unit 17, and sends the acquired current time and the acquired date and time to the unused time calculation unit 18.

The unused time calculation unit 18 calculates unused time from the sent date and time and the sent current time, and sends the calculated unused time to the control unit 19. The control unit 19 compares the sent unused time with the stored threshold value. In a usual case where the tool 30 to be mounted on the spindle 4 is exchanged in a short time, the control unit 19 can set the motion speed of the spindle 4 at the time of detachment of the tool 30 sufficiently high. Consequently, it is possible to shorten takt time.

On the other hand, in a case where the unused time is longer than the threshold value, the control unit 19 reduces the speed of only motion for raising the spindle 4 at the time of shift from the state of FIG. 4 to the state of FIG. 5, compared to the usual case. Consequently, while the takt time increases, there is an advantage that it is possible to prevent occurrence of impact or noise caused by sudden release of adhesion in a case where the tapered inner surface 4a of the spindle 4 and the tapered outer surface 31 of the tool 30 are adhered to each other.

That is, in a case where the stop state is kept for long time, the tapered inner surface 4a of the spindle 4 and the tapered outer surface 31 of the tool 30 are sometimes adhered to each other. In such a case, when the motion for pulling the tool 30 out of the spindle 4 is performed at high speed similar to the speed in the usual case, the spindle 4 is pulled downward more than necessary, and the adhesion is suddenly released in this state.

According to this embodiment, in a case where the unused time is longer than the predetermined threshold value, the speed at which the tool 30 is pulled out of the spindle 4 is reduced, and even when the tool 30 is adhered to the spindle 4, force for separating the adhesion is gradually increased, so that it is possible detach the tool without causing excessive impact. Consequently, there is an advantage that the spindle 4 and the tool 30 can be prevented from being damaged by large impact.

The speed at which the spindle head 7 is raised when the tool 30 is to be detached from the spindle 4 is made lower than the usual speed in this embodiment, but this is not a limitation. For example, slight raising of the spindle 4 and stop for predetermined time may be repeated, and slight raising and slight lowering of the spindle 4 may be repeated.

That is, in a case where the unused time calculated by the unused time calculation unit 18 is longer than the predetermined threshold value, the detaching motion of the tool 30 from the spindle 4 only need to be performed for longer time compared to a case where the calculated unused time is at or less than the threshold value.

In this embodiment, the date and time when the operation of the spindle 4 is stopped last are stored. However, in place of this, date and time when the tool 30 is exchanged last may be stored. Consequently, it is possible to easily determine the length of the mounting time of the tool 30 similarly.

Figure 6:
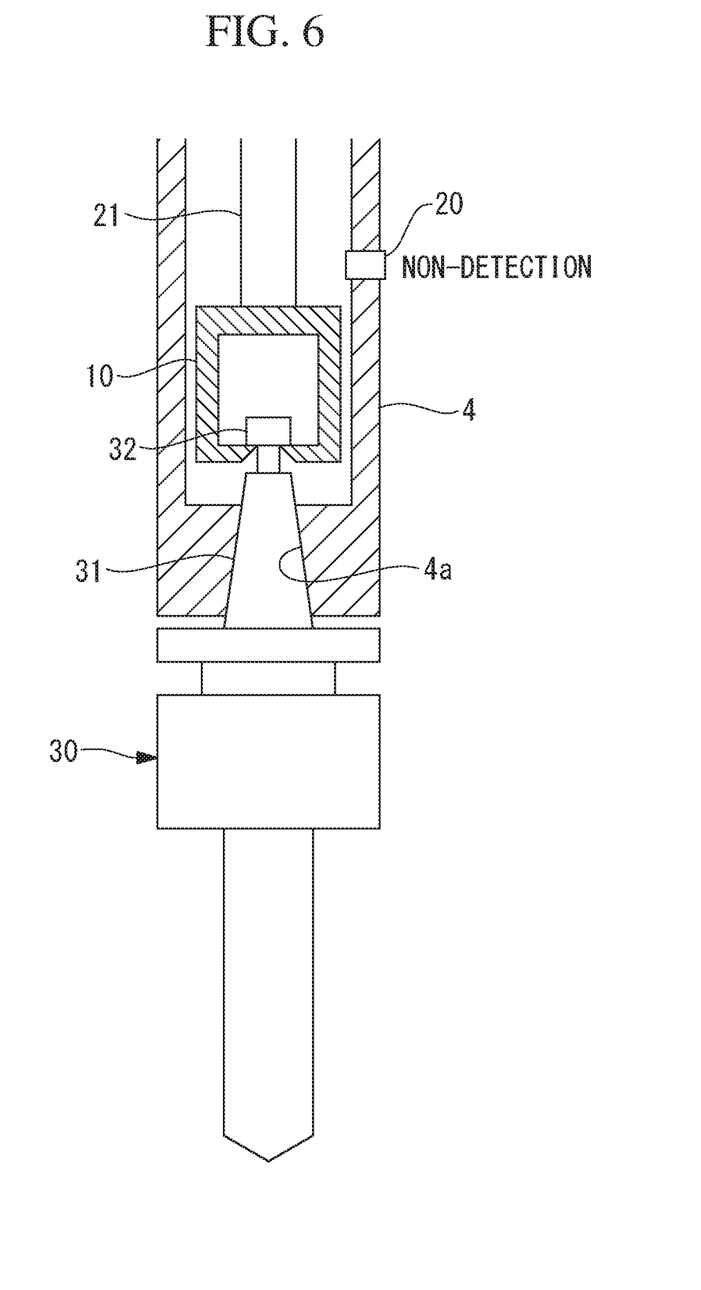
FIG. 6 is a partial longitudinal sectional view schematically illustrating a state in which a proximity sensor provided in the spindle does not detect a drawbar, and the tool is mounted on the spindle.
Figure 7:
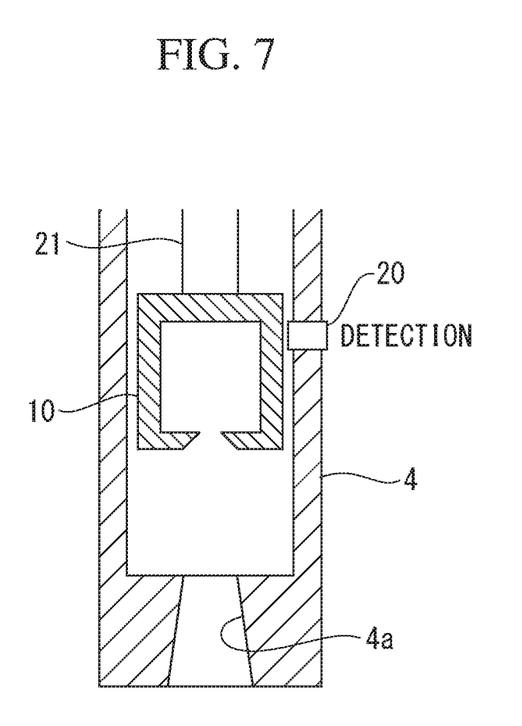
FIG. 7 is a partial longitudinal sectional view schematically illustrating a state in which the proximity sensor provided in the spindle detects the drawbar, and the tool is not mounted on the spindle.

As illustrated in FIG. 6 and FIG. 7, a proximity sensor (tool determining portion) 20 for detecting whether or not the tool 30 is mounted is disposed in the spindle 4. In a case where the proximity sensor 20 does not detect the drawbar 10 as illustrated in FIG. 6, it may be determined that the tool 30 is mounted. Then, input from the proximity sensor 20 may be entered to the control unit 19 for the control unit 19 to reduce the motion speed of the spindle head 7 and so forth only in a case where the tool 30 is mounted.

In the drawing, reference numeral 21 denotes a spring that is provided in the drawbar 10 and biases the mounted tool 30 to be mounted upward.

When the proximity sensor 20 is brought into a state of FIG. 7 in which the drawbar 10 is detected, the control unit 19 may reset information of the date and time stored in the stop date and time storage unit 17. Consequently, elapsed time when the tool 30 is not mounted can be prevented from being included in the unused time.

In this embodiment, a mechanism for attaching and detaching the tool 30 by the grip 11 mounted on the turret 12 by swinging the turret 12 is exemplified as the tool changing device 5. However, the tool changing device 5 is not limited to this, and other tool changing device may be employed. The date and time when the operation of the spindle 4 is stopped last are stored, and the unused time is calculated from the stored date and time and current time, when the tool 30 is exchanged. However, in place of this, the unused time may be counted from time when the operation of the spindle 4 is stopped last.

It is determined whether or not the unused time is longer than the predetermined threshold value. However, the threshold value may be able to be arbitrarily changed. The threshold value may be automatically changed on the basis of at least one of the mass of the tool 30 mounted on the spindle 4, the temperature of each unit of the machine tool 1, and a kind of coolant to be used in the machine tool 1.

The mass of the tool 30, the temperature, and the kind of coolant causes a change in a condition of adhesion of the tool 30 to the spindle 4, and therefore the threshold value can be changed on the basis of information of these to reduce the threshold value under a condition in which adhesion is facilitated, so that the speed can be reduced even in a short unused time.

An acceleration sensor that measures the magnitude of impact at the time of detachment of the tool 30 from the spindle 4 may be provided, and the threshold value at the time of next detachment of the tool 30 may be changed in accordance with the magnitude of impact measured by the acceleration sensor. In a case where impact larger than the predetermined threshold value is measured, the speed can be reduced at the time of the next detachment even in shorter unused time to reduce the impact.

Information such as the mass of the tool 30, the temperature of each unit of the machine tool 1, the kind of coolant, and the magnitude of impact may be collected in a server connected in an upper level via a network, and a proper threshold value may be calculated by use of machine learning. Consequently, there is an advantage that a proper threshold value that is unlikely to cause impact is set by including information collected in other machine tool, and soundness of the spindle 4 and the tool 30 can be maintained while takt time is prevented from increasing more than necessary.

The invention claimed is:

1. A machine tool comprising:
   a spindle that allows a tool to be detachably mounted thereon;
   a tool changing device that holds a plurality of tools, and attaches and detaches any of the tools to and from the spindle;
   a date and time storage unit that stores a date and time at which operation of the spindle is stopped last; and
   a calculation unit that, when one of the tools is to be detached from the spindle, calculates an amount of unused time of the spindle on the basis of the date and time stored in the date and time storage unit, wherein
   in a case where the amount of unused time calculated by the calculation unit is longer than a predetermined threshold value, a control unit is configured to cause a relative movement between the tool changing device and the spindle to perform a detaching of the one tool from the spindle to occur for a longer time compared to a case where the calculated unused time is at or less than the threshold value.

2. The machine tool according to claim 1, comprising
   a tool determining portion that determines whether or not one of the tools is mounted on the spindle, wherein
   for the case where the amount of unused time calculated by the calculation unit is longer than the predetermined threshold value, the control unit is configured to cause the relative movement between the tool changing device and the spindle to occur for the longer time based on the tool determining portion determining that the one of the tools is still mounted on the spindle.

3. The machine tool according to claim 1, wherein
   the control unit increases the time required for the relative movement between the tool changing device and the spindle by reducing a speed of motion for moving the spindle.

* * * * *